(12) United States Patent
Heidasch

(10) Patent No.: US 8,731,998 B2
(45) Date of Patent: May 20, 2014

(54) THREE DIMENSIONAL VISUAL REPRESENTATION FOR IDENTIFYING PROBLEMS IN MONITORED MODEL ORIENTED BUSINESS PROCESSES

(75) Inventor: Robert Heidasch, Speyer (DE)

(73) Assignee: SAP AG, Walldorf (DE)

( * ) Notice: Subject to any disclaimer, the term of this patent is extended or adjusted under 35 U.S.C. 154(b) by 1420 days.

(21) Appl. No.: 11/713,132

(22) Filed: Mar. 1, 2007

(65) Prior Publication Data

US 2008/0215389 A1    Sep. 4, 2008

(51) Int. Cl.
*G06Q 10/00* (2012.01)

(52) U.S. Cl.
USPC .................. 705/7.38; 705/7.39; 705/7.27

(58) Field of Classification Search
USPC ....................... 705/7.38, 7.39, 7.27
See application file for complete search history.

(56) References Cited

U.S. PATENT DOCUMENTS

| | | | | |
|---|---|---|---|---|
| 4,292,129 A * | 9/1981 | Barry | | 376/259 |
| 4,642,614 A * | 2/1987 | Cook | | 340/608 |
| 5,720,018 A * | 2/1998 | Muller et al. | | 345/581 |
| 5,918,226 A * | 6/1999 | Tarumi et al. | | 1/1 |
| 6,434,628 B1 * | 8/2002 | Bowman-Amuah | | 714/48 |
| 6,445,774 B1 * | 9/2002 | Kidder et al. | | 379/9.03 |
| 6,658,586 B1 * | 12/2003 | Levi | | 714/4 |
| 6,708,291 B1 * | 3/2004 | Kidder | | 714/39 |
| 6,888,541 B2 * | 5/2005 | Morse | | 345/419 |
| 7,003,781 B1 * | 2/2006 | Blackwell et al. | | 719/327 |
| 7,043,714 B2 * | 5/2006 | Lin et al. | | 717/102 |
| 7,065,493 B1 * | 6/2006 | Homsi | | 705/7.26 |
| 7,114,104 B1 * | 9/2006 | Bennett | | 714/38 |
| 7,389,335 B2 * | 6/2008 | MacLeod et al. | | 709/223 |
| 7,433,852 B1 * | 10/2008 | Bertrand et al. | | 706/45 |
| 7,464,366 B2 * | 12/2008 | Shukla et al. | | 717/100 |
| 7,475,275 B2 * | 1/2009 | Chafle et al. | | 714/4 |
| 7,505,949 B2 * | 3/2009 | Grichnik | | 706/44 |
| 7,525,678 B2 * | 4/2009 | Wiechers et al. | | 358/1.15 |
| 7,565,640 B2 * | 7/2009 | Shukla et al. | | 717/105 |
| 7,570,382 B2 * | 8/2009 | Savov | | 358/1.15 |
| 7,665,064 B2 * | 2/2010 | Able et al. | | 717/117 |
| 7,684,994 B2 * | 3/2010 | Kodger, Jr. | | 705/333 |
| 7,805,509 B2 * | 9/2010 | Alon et al. | | 709/224 |
| 7,848,942 B2 * | 12/2010 | Sadiq | | 705/7.11 |
| 7,949,619 B2 * | 5/2011 | Narayanaswamy et al. | | 706/12 |
| 7,962,616 B2 * | 6/2011 | Kupferman et al. | | 709/225 |
| 8,181,150 B2 * | 5/2012 | Szpak et al. | | 717/104 |
| 2001/0044738 A1 * | 11/2001 | Elkin et al. | | 705/8 |
| 2003/0033191 A1 * | 2/2003 | Davies et al. | | 705/10 |
| 2003/0233387 A1 * | 12/2003 | Watanabe et al. | | 709/100 |
| 2004/0066747 A1 * | 4/2004 | Jorgensen et al. | | 370/241 |

(Continued)

OTHER PUBLICATIONS

Bristol.com web pages—TransactionVision Bristol Technologies, Inc. Feb. 2005, Retrieved from Archive.org Oct. 5, 2010.*

(Continued)

*Primary Examiner* — Scott L Jarrett
(74) *Attorney, Agent, or Firm* — Mintz Levin Cohn Ferris Glovsky and Popeo, P.C.

(57) ABSTRACT

A computer implemented method and system for monitoring a business process of an executing business application. Runtime information of a business process element of the executing business application is received. The runtime information is then associated with design time information of the executing business application by a processor. Next, a representation of the business process associated with the business process element is generated to determine a problem in the business process of the executing business application.

9 Claims, 3 Drawing Sheets

(56) References Cited

U.S. PATENT DOCUMENTS

| | | | |
|---|---|---|---|
| 2004/0233056 A1* | 11/2004 | Pulfer | 340/568.2 |
| 2005/0049891 A1* | 3/2005 | Wilson | 705/1 |
| 2005/0091093 A1* | 4/2005 | Bhaskaran et al. | 705/7 |
| 2005/0131750 A1* | 6/2005 | Kogan et al. | 705/9 |
| 2006/0085798 A1* | 4/2006 | Bendiksen et al. | 719/318 |
| 2006/0143057 A1* | 6/2006 | Sadiq | 705/7 |
| 2007/0276711 A1* | 11/2007 | Shiu et al. | 705/7 |
| 2008/0162232 A1* | 7/2008 | Gamarnik et al. | 705/7 |

OTHER PUBLICATIONS

Yu, Tao et al., Model Driven Development of Business Process Monitoring and Control Systems ICEIS 2005.*

Alles, Michael et al., Continuous monitoring of business process controls Internatinoal Journal of Accounting Information Systems, vol. 7, 2006.*

Curtis, D., Magic Quadrant for Enterprise Event Management, 2003 Gartner, Research Note, May 29, 2003.*

HP OpenView Event Correlation Services brochure Hewlett Packard, Feb. 2003.*

Quest.com web pages—Foglight Quest Software, Aug. 23, 2005.*

PATROL Enterprise Manager Features, Functions and Technology Overview BMC Software, 2005.*

Bristol.com web pages—TransactionVision Bristol Technologies, Inc., Feb. 2005, Retrieved from Archive.org Oct. 5, 2010.*

SAP R/3—Status Icon Guidelines SAP, Jan. 2003, Retrieved from Archive.org.*

Traffic Lights (SAP Library—SAP Business Information Warehouse) SAP Online Help, SAP Netweaver 2004 SPS23 Help.*

Turbit, Neville, Measuring Project Health Jun. 27, 2005.* iDashes.net web pages iDashes, Inc., May 2001, Retrieved from Archive.org Jan. 25, 2007.*

Ergometrics.com web pages Ergometrics, Mar. 2000, Retrieved from Archive.org Jan. 25, 2007.*

Arnold, Tom, Dashboard & Scorecard Software Tools for Operations Management and Strategy Deployment Summit Media Partners, Sep. 18, 2002.*

Gavin, Lee et al., Business Integratino Management using WebSphere BI Modeler and Monitor: A Real world cast study IBM, Redbook SG24-7-24-00, Mar. 2004.*

Bonnen, Carsten et al., SAP NetWeaver Visual Composer SAP, Galio Press, 2006.*

Enabling the Real-Time Enterprise Business Activity Monitoring With Ensemble InterSystems Corporation, 2004.*

Burden, Kevin, Taking the 'techie' out of the workflow design Computerworld, vol. 31, No. 37, Sep. 15, 1997.*

Oracle Workflow Administrators Guide - Release 2.6.3 Oracle, Sep. 2003.*

Intalio Adds Celequest BAM Technology to its BPMS Solution; Celequest Process Management Dashboards Integrated into Intalio/BPMS, BusinessWire, Jan. 17, 2006.*

Adoble LiveCycle Workflow Version 7.2, Overview Adobe, Systems, Jul. 2006.*

Using Business Activity Monitoring ES Dashboard, Adobe LiveCycle ES Adobe, Jul. 2007.*

SAP Solution Manager: Solution Monitoring - Active Global Support SAP, 2005.*

Intalio Adds Celequest BAM Technology to its BPMS Solution; Celequest Process Management Dashboards Integrated into Intalio/BPMS, Business Wire, Jan. 17, 2006.*

Oracle Business Activity Monitoring - Enterprise Link Administrators Guide - 10g Release Oracle, Oct. 2006.*

Boomi Integration Platform Boom, Inc., 2006.*

* cited by examiner

THREE DIMENSIONAL VISUAL REPRESENTATION FOR IDENTIFYING PROBLEMS IN MONITORED MODEL ORIENTED BUSINESS PROCESSES

BACKGROUND

This disclosure relates generally to computer-based mechanisms for business process monitoring, and more particularly to techniques and systems for model-oriented business process monitoring.

Modern business applications, such as Enterprise Service Oriented Applications (ESOA) provided by SAP AG of Walldorf, Germany, are business process-oriented, which means they are flexibly and effectively adapted to real-life business processes. To build such business process applications, the business platform provider usually delivers predefined business processes to a customer, and the customer adapts them to local business needs or to create its own business processes.

Such business process-oriented applications have distinct design-time and runtime contexts. For business process design-time, applications and tools are needed that support defining each model-oriented business process and help in its implementation. Second, for business process runtime, a platform is needed that performs the execution of the business processes.

In typical implementations, a expert associated with the customer defines the business process model in the business process design-time. The business process model includes elements such as business objects, service interfaces, etc. Next, the required functionality (for example proxies and implementation classes, etc.) is implemented according to the business process model definition. Accordingly, the business process model definition is used by the business process applications to execute particular business process.

The business process designer needs to be able to easily detect and solve problems that occur in the business process execution. However, in some implementations, it is not well-understood how to organize business process monitoring, or how to present a problem should one occur. Further, some implementations lack some tools that could help the business process designer or other expert detect and solve problems. Such aspects, while improving business process management and the utility of business process applications, would also reduce the total cost of ownership (TCO) of business process applications by the customer.

SUMMARY

In general, this document discusses a system and method for monitoring business processes of a business application. The business application and business processes are typically distributed across a heterogeneous computing landscape, and the monitoring system and method increase the usability and simplicity of the business process-oriented applications.

In general, the monitoring system and method are adapted to present the problematic process (runtime monitoring data) using the business process definition. This view simplifies problem analysis because a user gets information about the problem or errors, and is presented with enough data to be able to drill down to see the problem details. This new monitoring solution enables automatic navigation to the problematic/erroneous business object step (business object, application functionality, etc., and reduces the number and amount of transferred information and/or data to avoid data replication.

In one aspect, a method of monitoring a business process of an executing business application is presented. The method includes the steps of receiving runtime information of a business process element of the executing business application, and associating the runtime information with design time information of the executing business application. The method further includes a step of generating a representation of the business process associated with the business process element to determine a problem in the business process of the executing business application.

In another aspect, a computer-implemented method of monitoring a business application includes each business process reporting information about a status of operation to a business process monitor system. The computer-implemented method further includes the business process monitor system collecting the information, generating a list of business processes of the business application, and selecting particular business processes from the list of business processes to generate a graphical view of at least a portion of the business application based on a business process model and according to the status of operation of each business process.

The details of one or more implementations are set forth in the accompanying drawings and the description below. Other features and advantages will be apparent from the description and drawings, and from the claims.

BRIEF DESCRIPTION OF THE DRAWINGS

These and other aspects will now be described in detail with reference to the following drawings.

Like reference symbols in the various drawings indicate like elements.

DETAILED DESCRIPTION

This document describes a business process monitoring system and method for a distributed business application software system, that enables a user find and solve problems during execution of the business application. The business process monitoring system described herein integrates the information and data from both design-time and runtime. With such integrated information, a user can obtain a complete and clear picture of the particular business process.

In accordance with a preferred implementation, the business process monitoring system uses the same visual tool and graphical user interface (GUI) that is used to design each business process to simplify the problem analysis. This means that the business process runtime data—data reported by the application components that describe action status and problems—are integrated into the business process model at design-time, and then presented to the GUI.

Figure 1:
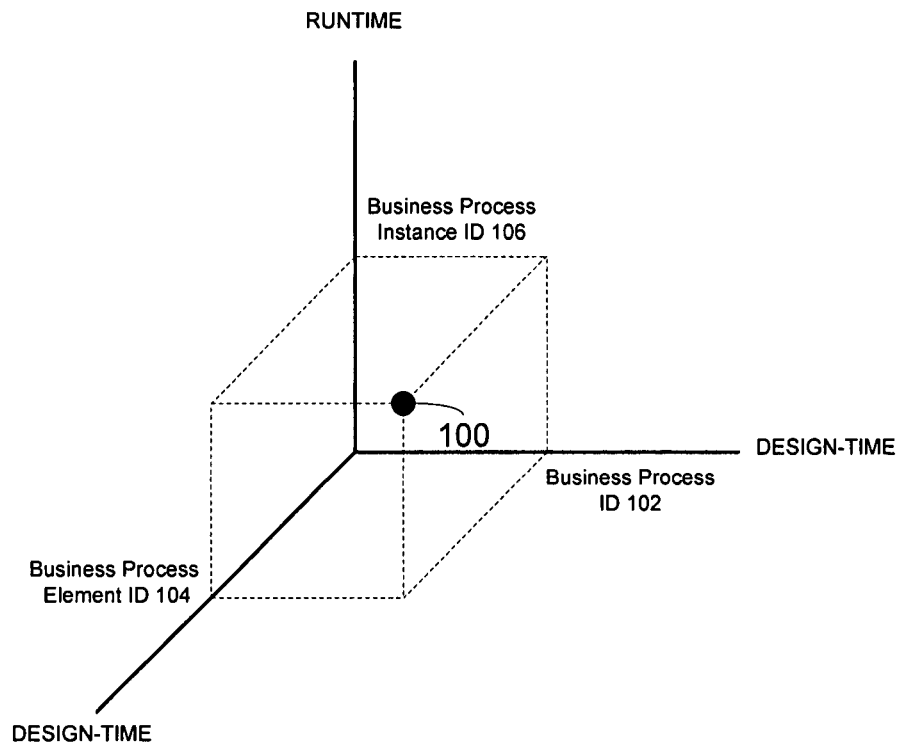
FIG. 1 illustrates the combination of design-time and runtime information to identify a problem in a business process-oriented application.

Identification of problems that occur during execution of particular business processes of a business application requires an identification of a problematic business process element, such as a business object or an action within a business process, where the error occurs. As illustrated in FIG. 1 to identify a problematic element 100 within the executed business application, the system provides the following information:

business process ID 102—an identifier that recognizes the particular executed business process model, business process element ID 104—an identifier that recognizes the particular business process element, business process instance ID 106—an identifier that recognizes at runtime the instance of the business process model.

Figure 2:
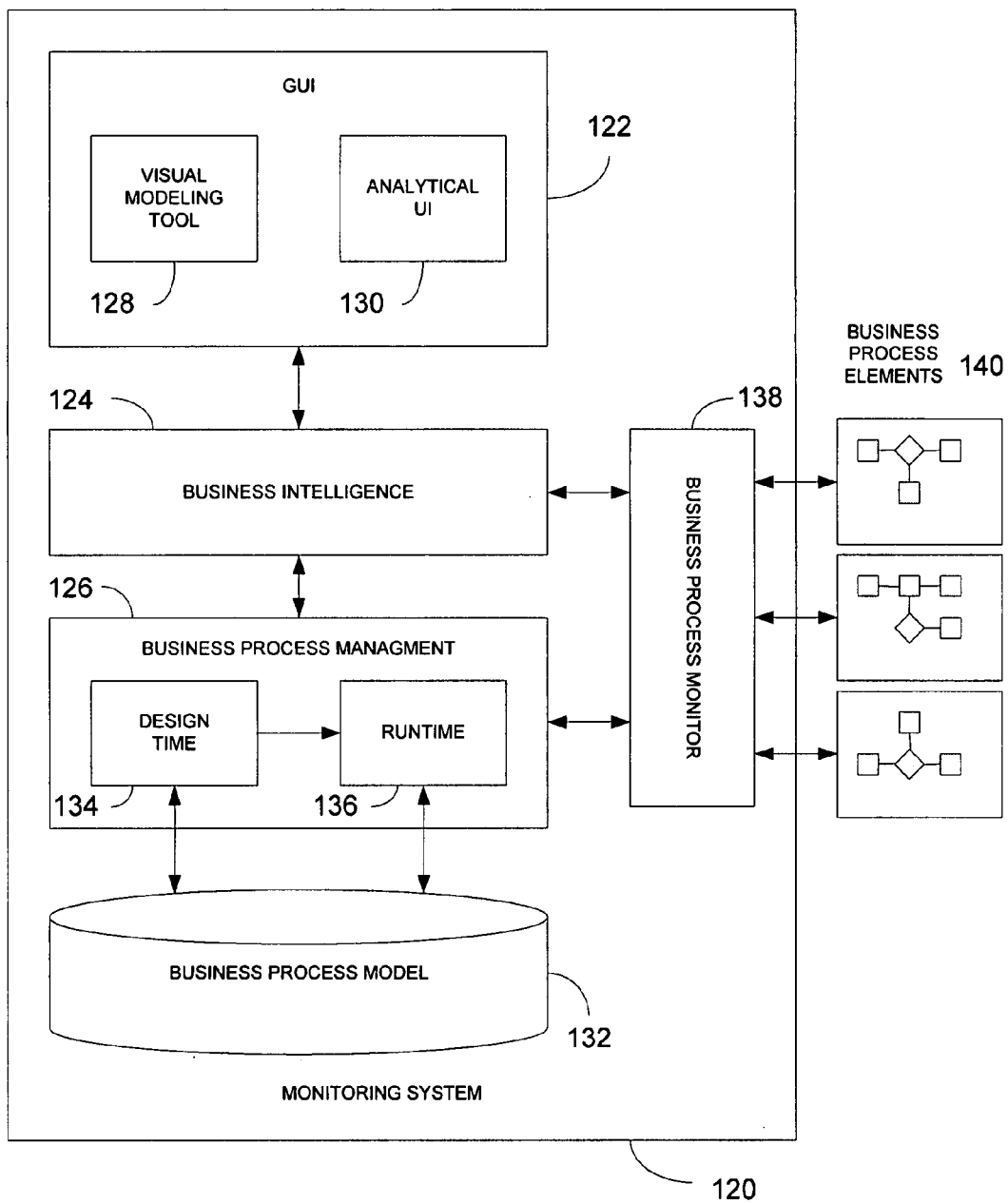
FIG. 2 illustrates a business application monitoring system.

FIG. 2 illustrates an exemplary business process monitoring system 120 that includes a graphical user interface 122, a business intelligence module 124, and a business process management module 126. The graphical user interface (GUI) 122 provides a graphical electronic display for a user, and can include a visual modeling tool 128 within which business processes of a business application can be designed and modeled using graphical elements representative of business process elements. The GUI 122 also includes an analytical user interface (UI) 130 that displays, based on the business process model, elements of a business process as executed in runtime for easy identification and solution generation.

The business intelligence module 124 provides process metrics and analytical services and tools for analyzing business process execution and problem solving. The business process management module 126 provides business processes as defined by the business process model that is stored in a business process model repository 132. A design time component 134 is accessible by a user via the graphical user interface 122 to graphically assemble elements of a business process according to the business process model. A runtime component 136 of the business process management module 126 is used to evaluate an actual execution of a business process.

The business process monitoring system 120 further includes a business process monitor 138 that is responsive to, and receives data and information from, one or more executing business process elements 140. The executing business process elements 140 are based on the runtime business processes provided by the runtime component 136 of the business process module. The business process elements report information as described below for problem detection and analysis.

Figure 3:
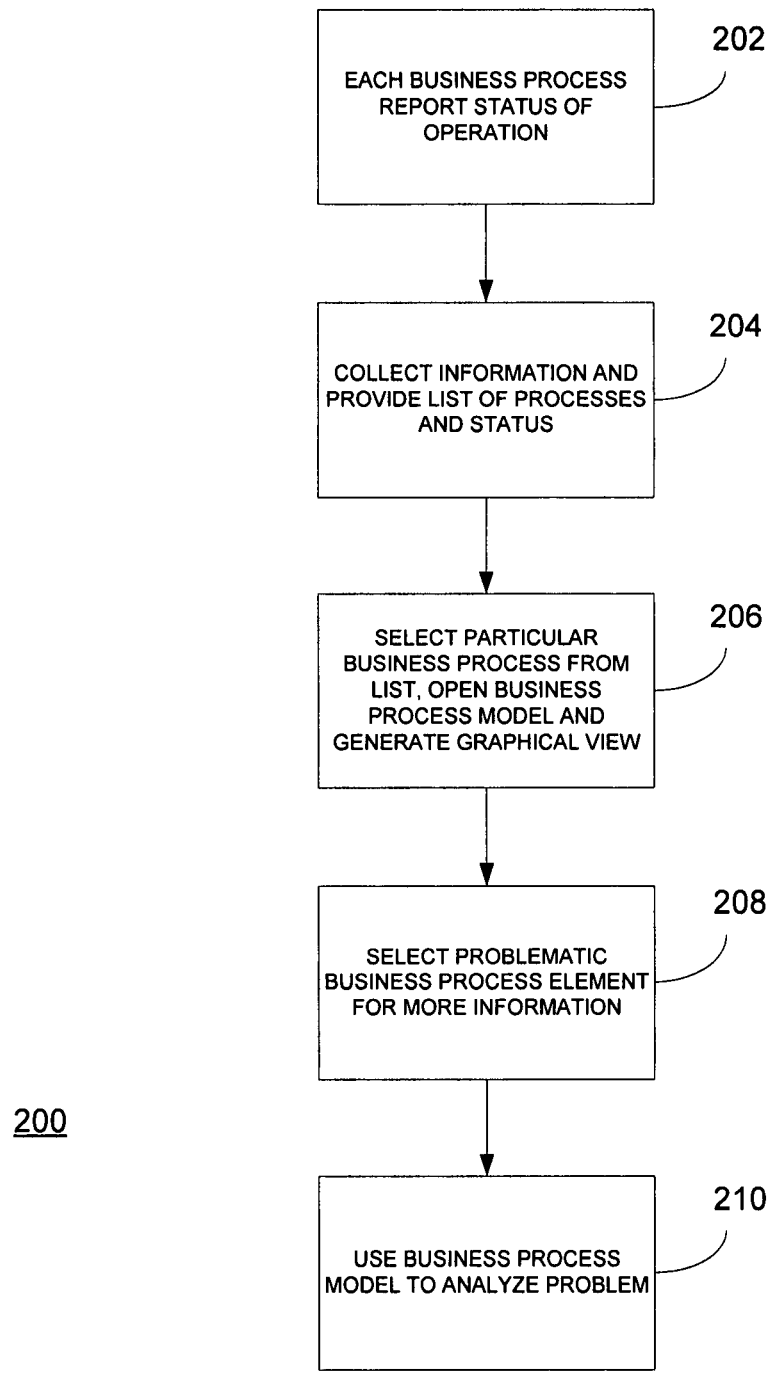
FIG. 3 is a flowchart of a monitoring method for a business process-oriented application.

In accordance with preferred implementations, and as illustrated in FIG. 3, a business process monitoring method 200 is performed as follows: At 202, each business process element (e.g. business object, action, business process step, or other component) reports to a monitoring system the status of its particular related operation (business object and business process step). The following information is reported without transferring all runtime-relevant information:

a business process ID—identifies the particular business process model, a business process element ID—identifies the particular business process element that reports the status/problem. The same business process element can be used to define different business processes and therefore must be identified separately.

a business process instance ID—identifies the particular runtime instance of the business process model.

an action status and/or problem, a problem description, and a Uniform Resource Locator (URL)—a link to a page in a server from which to get more detailed information.

At 204, the monitoring system collects the information and provides a list of business processes and their status. The list contains a runtime view of the relevant business processes. The list is configured for display in the analytical UI.

At 206, a particular business process can be selected from the list in the analytical UI, and then the monitoring system opens the business process model and configures the business process model with states that were reported by the particular business element to generate a graphical state view. The graphical state view includes a representation of the state of particular business objects and process steps that participated in the business process execution. The representation of the state can include such graphical elements as a traffic light format with red (error), yellow (caution) and green (normal) states. Other types of representations can be used.

At 208, the problematic business process element is selected, and the monitoring system automatically delivers more information to the user. For example, the monitoring system can redirect the user to the particular application component which implements the business object or which performed the relevant business process step.

With the design-time and runtime information and data used to detect and present a problem, at 210 the user can then use the business process model to analyze problem. The user can use the same or similar visual tool to define the business process model and the business process elements, which simplifies analysis and makes it easier to understand where the problem occurred.

The business process monitoring system presents only the most important information or data. Additional data is delivered and presented on demand. Therefore, the user can selectively monitor a particular business process element or elements that are involved in the execution of particular business processes, and provide information that helps to detect and solve particular problem. Further, the monitoring system enables a user to request additional detailed information. This reduces the amount monitoring-relevant information and/or data that is transmitted, leading to a positive impact on system performance. Also, the system avoids data a replication problem that may occur during collection of business process-related data and messages.

Implementations of the invention and all of the functional operations described in this specification can be implemented in digital electronic circuitry, or in computer software, firmware, or hardware, including the structures disclosed in this specification and their structural equivalents, or in combinations of them. Implementations of the invention can be implemented as one or more computer program products, i.e., one or more modules of computer program instructions encoded on a computer readable medium, e.g., a machine readable storage device, a machine readable storage medium, a memory device, or a machine-readable propagated signal, for execution by, or to control the operation of, data processing apparatus.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of them. A propagated signal is an artificially generated signal, e.g., a machine-generated electrical, optical, or electromagnetic signal, that is generated to encode information for transmission to suitable receiver apparatus.

A computer program (also referred to as a program, software, an application, a software application, a script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for executing instructions and one or more memory devices for storing instructions and data. Generally, a computer will also include, or be operatively coupled to, a communication interface to receive data from or transfer data to, or both, one or more mass storage devices for storing data, e.g., magnetic, magneto optical disks, or optical disks.

Moreover, a computer can be embedded in another device, e.g., a mobile telephone, a personal digital assistant (PDA), a mobile audio player, a Global Positioning System (GPS) receiver, to name just a few. Information carriers suitable for embodying computer program instructions and data include all forms of non volatile memory, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, implementations of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations of the invention can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the invention, or any combination of such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

Certain features which, for clarity, are described in this specification in the context of separate implementations, may also be provided in combination in a single implementation. Conversely, various features which, for brevity, are described in the context of a single implementation, may also be provided in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Particular implementations have been described. Other implementations are within the scope of the following claims. For example, the steps recited in the claims can be performed in a different order and still achieve desirable results. In addition, implementations of the invention are not limited to database architectures that are relational; for example, the invention can be implemented to provide indexing and archiving methods and systems for databases built on models other than the relational model, e.g., navigational databases or object oriented databases, and for databases having records with complex attribute structures, e.g., object oriented programming objects or markup language documents. The processes described may be implemented by applications specifically performing archiving and retrieval functions or embedded within other applications.

What is claimed:

1. A non-transitory computer program product storing instructions that, when executed by at least one programmable processor, cause the at least one programmable processor to perform operations of monitoring a business process of an executing business application, the operations comprising:

receiving, at a business process monitor, runtime information and design time information of a business process element of the business application executing a business process;

integrating, by a business process management module connected to the business process monitor, the runtime information with the design time information to generate integrated information, the runtime information including a description of an action of the business process element and a business process instance identifier, the design time information including a business process model of the business process, the integrated information being displayed in a three-dimensional structure characterizing data associated with the business process element, the three dimensional structure comprising a three-dimensional visual representation of at least a portion of the integrated information, the three-dimensional visual representation having a first dimension identifying the business process, a second dimension identifying the business process element, and a third dimension characterized by an instance of the business process that is being executed on the business application;

determining, by a business intelligence module connected to the business process monitor and the business process management module, a problem in the business process element of the executing business application, the problem being determined based on the integrated information displayed in the three-dimensional structure; and selectively monitoring, by the business process monitor, a functionality of the business process element having the problem, the selective monitoring displaying the three-dimensional structure and a representation of the business process model associated with the business process to facilitate a solving of the problem, wherein the representation of the business process model identifies the business process element having the problem.

2. The computer program product of claim 1, wherein:
the business application is currently being executed; and
the business process model is generated using a visual modeling tool executed on a graphical user interface connected to the business intelligence module.

3. The computer program product of claim 2, wherein the graphical user interface displays the three-dimensional representation wherein:
the first dimension is characterized by a first identifier identifying the business process; and
the second dimension is characterized by a second identifier identifying the business process element.

4. A method of monitoring a business process of an executing business application comprising:
receiving, at a business process monitor, runtime information and design time information of a business process element of the business application executing the business process;
integrating, by a business process management module that is executed by at least one processor and is connected to the business process monitor, the runtime information with the design time information to generate integrated information, the runtime information including a business process element identifier identifying the business process element, the design time information including a business process model of the business process, the integrated information being displayed in a three-dimensional structure characterizing data associated with the business process element, the three dimensional structure comprising a three-dimensional representation having a first dimension identifying the business process, a second dimension identifying the business process element, and a third dimension characterized by an instance of the business process that is being executed on the business application;
determining, by a business intelligence module connected to the business process monitor and the business process management module, a problem in the business process element of the executing business application, the problem being determined based on the integrated information displayed in the three-dimensional structure; and
selectively monitoring, by the business process monitor, a functionality of the business process element having the problem, the selective monitoring displaying the three-dimensional structure and a representation of the business process model associated with the business process to facilitate a solving of the problem, wherein the representation of the business process model is configured to identify the business process element having the problem.

5. The method of claim 4, wherein:
the business application is currently being executed; and
the business process model is generated using a visual modeling tool executed on the graphical user interface.

6. The method of claim 4, wherein the graphical user interface further displays the three-dimensional representation, the three-dimensional representation characterizing at least a portion of the integrated information, wherein:
the first dimension is characterized by a first identifier identifying the business process; and
the second dimension is characterized by a second identifier identifying the business process element.

7. A system for monitoring a business process of an executing business application comprising:
at least one programmable processor; and
a machine-readable medium storing instructions that, when executed by the at least one processor, cause the at least one programmable processor to perform operations comprising:
receiving, at a business process monitor, runtime information and design time information of a business process element of the business application executing the business process;
integrating, by a business process management module connected to the business process monitor, the runtime information with the design time information to generate integrated information, the runtime information including a description of an action of the business process element, the design time information including a business process model of the business process, the integrated information being displayed in a three-dimensional structure characterizing data associated with the business process element;
determining, by a business intelligence module connected to the business process monitor and the business process management module, a problem in the business process element of the executing business application, the problem being determined based on the integrated information displayed in the three-dimensional structure, the three dimensional structure comprising a three-dimensional representation having a first dimension identifying the business process, a second dimension identifying the business process element, and a third dimension characterized by an instance of the business process that is being executed on the business application; and
selectively monitoring, by the business process monitor, a functionality of the business process element having the problem, the selective monitoring displaying the three-dimensional structure and a representation of the business process model associated with the business process to facilitate a solving of the problem, wherein the representation of the business process model is used to identify the business process element having the problem.

8. The system of claim 7, wherein:
the business application is currently being executed; and
the business process model is generated using a visual modeling tool executed on a graphical user interface connected to the business intelligence module.

9. The system of claim 7, wherein the graphical user interface displays the three-dimensional representation wherein:
the first dimension is characterized by a first identifier identifying the business process; and
the second dimension is characterized by a second identifier identifying the business process element.

* * * * *